L. THIEL.
LATHE GEARING.
APPLICATION FILED MAR. 28, 1919.

1,352,925.

Patented Sept. 14, 1920.
3 SHEETS—SHEET 1.

Inventor
Louis Thiel,
By C. W. Miles.
Attorney

UNITED STATES PATENT OFFICE.

LOUIS THIEL, OF CINCINNATI, OHIO, ASSIGNOR TO THE CINCINNATI LATHE & TOOL COMPANY, OF CINCINNATI, OHIO, A CORPORATION OF OHIO.

LATHE-GEARING.

1,352,925.  Specification of Letters Patent.  Patented Sept. 14, 1920.

Application filed March 28, 1919. Serial No. 285,885.

*To all whom it may concern:*

Be it known that I, LOUIS THIEL, a citizen of the United States, residing at Cincinnati, in the county of Hamilton and State of Ohio, have invented certain new and useful Improvements in Lathe-Gearing, of which the following is a specification.

My invention relates to improvements in lathes. One object is to provide improved speed changing mechanism interposed between the lathe spindle and a pulley driven at substantially uniform speed. Another object is to provide improved means to lubricate the speed changing mechanism. Another object is to provide a speed changing driving mechanism in which only a single train of gears is employed at a time, thereby avoiding wear, waste or loss of power from driving portions of the speed changing mechanism as idlers. Another object is to provide a speed changing mechanism which will not require periodic adjustments to compensate for wear and to preserve the necessary accuracy of movement. Another object is to provide improved spindle locking means. My invention also comprises certain details of form, combination, and arrangement, all of which will be fully set forth in the description of the accompanying drawings, in which:

Figures 1, 2:
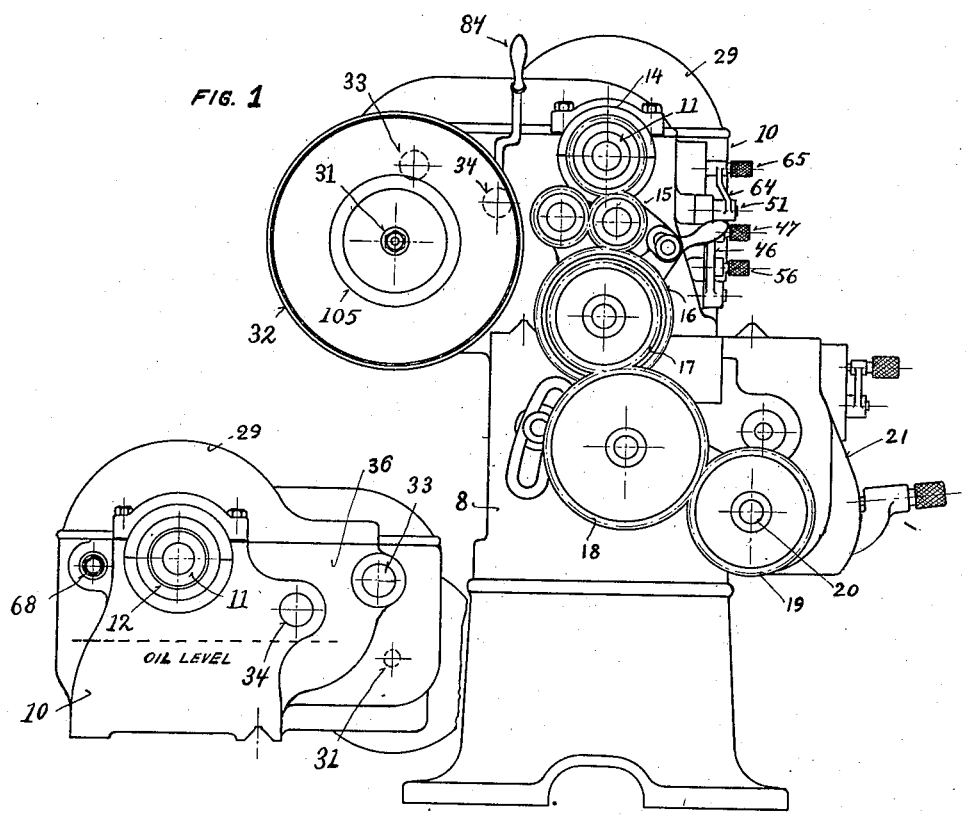
Figure 1 is an end view of a lathe from the headstock end, embodying my improvements.
Fig. 2 is an end view of the headstock detached, from the opposite end to that illustrated in Fig. 1.
Figure 3:
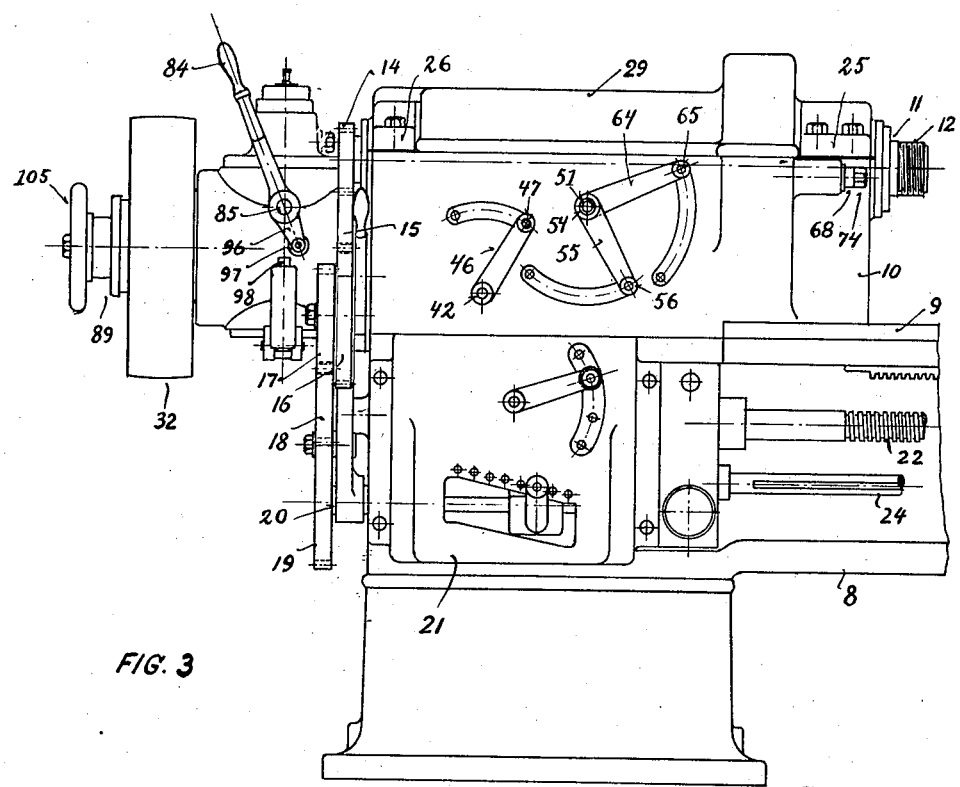
Fig. 3 is a front elevation of the headstock and a portion of the main frame of a lathe.
Figure 4:
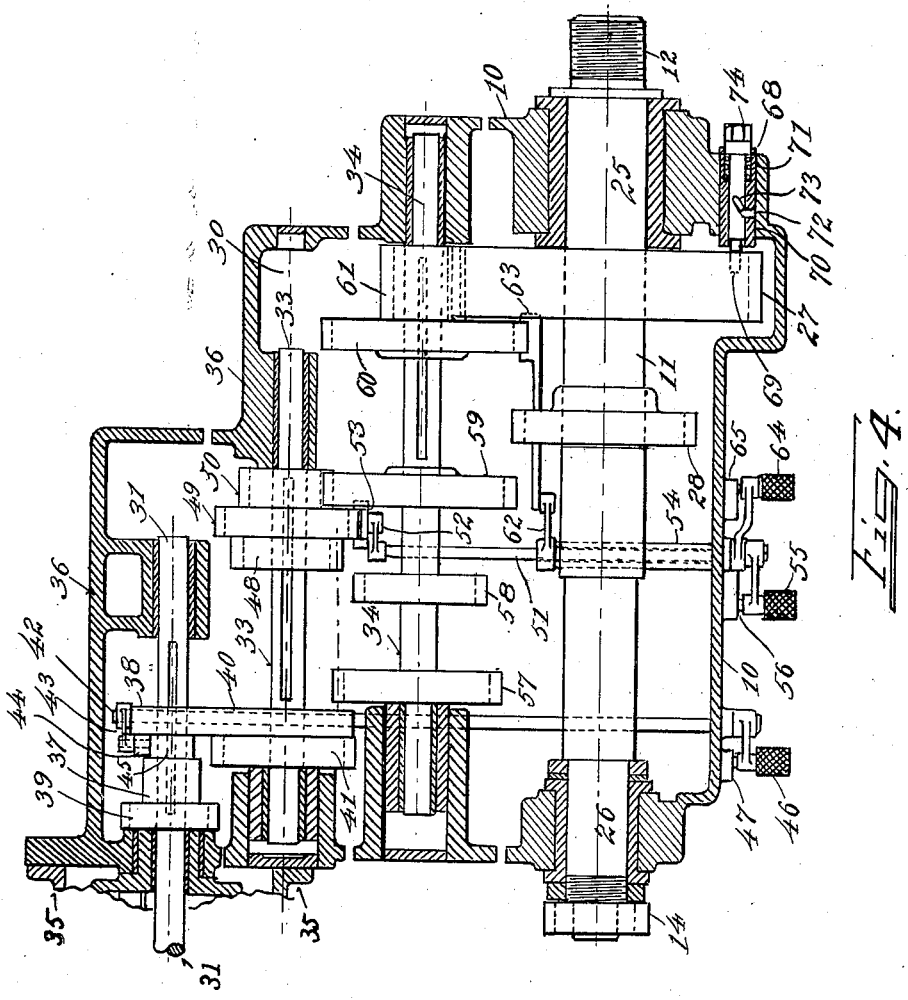
Fig. 4 is a diagrammatic sectional view illustrating in one plane the speed changing and actuating mechanism.

The accompanying drawings illustrate the preferred embodiment of my invention in which 8 represents the bed-plate or main frame of a lathe provided with the usual lathe ways 9 on which are mounted a headstock 10, and a tool carriage and tail-stock of any desired type, not shown. The headstock is provided with a lathe spindle 11 threaded at its forward end 12 to receive any one of a series of chucks and face plates, and adapted to detachably support a lathe center. At the rear end the spindle is preferably provided with a gear 14 which through a train of change gears 15, 16, 17, 18, and 19, is adapted to drive the driving shaft 20 of a feed-box or speed-changing mechanism 21 which serves to drive the lead screw 22 and feed shaft 24, or either of them. The feed-box 21 may be of any approved type, and its details are not a part of my present invention.

The lathe spindle is journaled at 25 and 26 near opposite ends in bearings in the headstock, and has rigidly mounted thereon spur gears 27 and 28. The headstock is provided with a cap 29 above the spindle and a chamber 30 at the rear side of the spindle to receive and house the speed changing mechanism.

The speed-changing mechanism.

The speed changing mechanism comprises a primary or driving shaft 31, which is driven indirectly from a driving pulley 32 in either direction; a second shaft 33, and a third shaft 34, from which the lathe spindle is driven through its gears 27 and 28.

The primary shaft 31 is mounted chiefly in a reversing-box or housing 35, but with one end thereof projecting into and journaled in the chamber 30 of the change-gear housing 36, preferably a portion of the headstock. A collar or sleeve 37 is splined to the shaft 31 within the housing 36 so as to be movable endwise on said shaft. The sleeve 37 has mounted rigidly thereon a spur gear 38 and a spur gear 39, which are respectively adapted by shifting the sleeve 37 endwise to engage the spur gears 40 and 41, rigidly mounted on the second shaft 33, to drive shaft 33 at two relatively different speeds relative to shaft 31. A crank shaft 42 journaled transversely to shaft 31 in the headstock has a crank arm 43 and shoe 44 at one end to engage an annular recess 45 in the sleeve 37 to shift said sleeve endwise. The opposite end of shaft 42 projects through the front of the headstock and is provided with an actuating lever 46 and a locking pin 47 by means of which shaft 42 may be shifted and locked in different positions to thereby shift the sleeve 37 endwise on shaft 31.

A group of three gears 48, 49, and 50 are rigidly connected together and are splined so as to move endwise on shaft 33, being shifted thereon by means of a crank shaft 51 which is journaled in bearings in the headstock and provided at one end with a crank arm 52 and shoe 53 engaging gear 49. At the opposite end shaft 51 is journaled in a tubular shaft 54 and projects through said tube and through the front of the headstock where it is provided with an actuating hand lever 55 and locking pin 56, by means of which said shaft 51 may be locked in position to hold either one of the gears 48, 49, and 50 in operative position.

The third shaft 34 has rigidly mounted thereon three gears 57, 58, and 59 respectively adapted to be engaged and driven by gears 48, 49, and 50. Also mounted on the shaft 34 are two gears 60 and 61, which are rigidly connected together and splined to shaft 34 so as to be adjustable endwise thereon. A crank arm 62 carried at the inner end of the tubular shaft 54, and a shoe member 63 engaging the gear 60 serve to shift gears 60 and 61 endwise on shaft 34. At the outer end of tubular shaft 54 outside of the headstock is a hand lever 64 and locking pin 65 to hold the gears 60 and 61 locked in their respective operative positions. The gears 60 and 61 are respectivly adapted to engage and drive the high speed gear 28 and the slow speed gear 27, both rigidly mounted upon the lathe spindle 11.

The spindle locking mechanism.

When it is desired to lock the spindle to the headstock as is required to conveniently remove a chuck from the spindle, or to hold the work against rotation, I employ a locking pin 68 to engage any one of a series of corresponding stops or recesses 69 preferably in the face of the gear 27. The pin 68 is seated in a sleeve 70 in which it is movable endwise, being normally held by a spring 71 out of engagement with the stops 69 carried by the spindle, and limited as to its endwise movement by means of a pin 72 extending through the wall of sleeve 70 into a spirally directed groove 73 in the cylindrical face or wall of the pin 68. The outer end of the pin 68, outside of the headstock is provided with a wrench seat 74, and when a wrench is applied to said wrench seat, the weight of the wrench handle automatically shifts the pin 68 rotatably against the action or tendency of the spring 71 to hold the pin 68 in a retracted position with the pin 72 at one end of spiral groove 73, and thereby causes the pin 72 to travel to the opposite end of the spiral groove 73, thereby thrusting the pin 68 endwise against the tension of spring 71 into the path of one of the stop members 69 to lock the lathe spindle 11 against rotation. As soon as the wrench is released from the outer end of pin 68, the spring 71 acts to retract the pin 68 and release the lathe spindle. The sleeve 70 is rigidly mounted relative to the headstock.

The reverse and stop mechanism.

One section of the primary driving shaft 31 is mounted and journaled in the reversing box or housing 35, preferably concentrically journaled in a cylindrical housing. The driving pulley 32 is loosely journaled upon a tubular portion of said housing 35, while the shaft 31 is journaled concentrically within said tubular portion of the housing. Within the housing 35 is a reverse driving mechanism adapted to drive the shaft 31 in either forward or reverse direction as may be desired. The reverse driving mechanism does not constitute a part of my present invention. The reverse driving mechanism is controlled by means of a hand lever 84 mounted upon a shaft 85 journaled in the housing 35, and provided with an arm 96 and roller 97 to engage a stud 98 to apply brake power to stop the shaft 31 when the lever 84 reaches a vertical position. The housing 35 is preferably bolted or otherwise attached to the speed changing housing 36 of the headstock. The speed change housing and lower portion of the headstock also form a reservoir to retain a supply of lubricating oil which is disseminated automatically by the rotating members mounted so as to dip therein.

A hand wheel 105 is keyed to the shaft 31 outside of the clutch member 89, and serves when desired to turn the shaft 31 by hand and through shaft 31 and the train of gears therefrom to the spindle 11 to rotate or accurately position the spindle 11 by hand, as for instance in chasing threads.

I am thus enabled to provide a maximum number of speed changes with a given number of change gears and shaft members, and also to avoid running any portion of the change gear mechanism in an idle condition so as to cause unnecessary wear. My improved speed changing mechanism is also operable for extended periods of time without injurious results or loss in accuracy due to wear of the parts, or requiring frequent adjustment thereof to be made to maintain operating conditions and accuracy. The spindle locking means being released automatically with removal of the wrench, avoids injury from oversight. The reversing and automatic stop mechanism is simple, strong, and readily detached and replaced or employed interchangeably with a similar element capable of being driven only in one direction as may be required.

The mechanism herein illustrated and described is capable of considerable modification without departing from the principle of my invention.

What I claim is.

1. A spindle driving mechanism comprising a headstock having a chamber formed therein to serve as a housing for speed-changing mechanism, a spindle journaled in said headstock and provided with a plurality of spindle driving gears of different diameters rigidly mounted thereon toward the forward or chuck supporting end of said spindle, first, second, and third speed-changing shafts journaled in said housing each provided with speed changing gears at their forward ends adjustable endwise to engage corresponding gears rigidly mounted upon the next succeeding shaft and shifting means actuated from the exterior of the headstock to adjust endwise and lock said adjustable gears.

2. A spindle driving mechanism comprising a headstock having a chamber formed therein to serve as a housing for speed-changing mechanism, a spindle journaled in said headstock and provided with a plurality of spindle driving gears of different diameters rigidly mounted thereon toward the forward or chuck supporting end of said spindle, first, second, and third speed-changing shafts journaled in said housing each provided with speed changing gears at their forward ends adjustable endwise to engage corresponding gears rigidly mounted upon the next succeeding shaft shifting means actuated from the exterior of the headstock to adjust endwise and lock said adjustable gears, and driving means carried by said headstock to drive said first shaft in forward or reverse direction from a pulley driven at substantially uniform speed.

3. A spindle driving mechanism comprising a headstock, first, second and third shafts and a spindle all journaled upon substantially parallel axes in the interior of said headstock, each of said shafts having at the same end a plurality of change gears adjustable endwise thereon to engage corresponding gears upon the next shaft mounted rigidly thereon, the endwise adjustable change gears upon the third shaft serving to engage and drive the lathe spindle through gears rigidly mounted thereon.

4. A spindle driving mechanism comprising a headstock having a chamber serving as a lubricant container and a housing for speed changing mechanism, first, second, and third shafts and a spindle all journaled upon substantially parallel axes in the interior of said headstock, each of said shafts having at the same end a plurality of change gears adjustable endwise thereon to engage corresponding gears upon the next shaft mounted rigidly thereon, the endwise adjustable change gears of the third shaft serving to engage and drive the lathe spindle through gears rigidly mounted thereon.

5. A spindle driving mechanism comprising a headstock, first, second, and third shafts and a spindle all journaled upon substantially parallel axes in the interior of said headstock, each of said shafts having a plurality of change gears adjustable endwise thereon to engage corresponding gears upon the next shaft mounted rigidly thereon, the endwise adjustable gears of the third shaft serving to engage and drive the lathe spindle through gears rigidly mounted on said spindle, a reversing gear housing detachably connected to the rear portion of said headstock and in which said first shaft is journaled, a driving pulley carried by said reversing gear housing, means within said reversing gear housing to reverse the direction of rotation of said first shaft, and a reversing lever operable from the exterior of said housing.

6. A spindle driving mechanism comprising a headstock, first, second, and third shafts and a spindle all journaled upon substantially parallel axes in the interior of said headstock, each of said shafts having a plurality of change gears adjustable endwise thereon to engage corresponding gears upon the next shaft mounted rigidly thereon, the endwise adjustable gears of the third shaft serving to engage and drive the lathe spindle through gears rigidly mounted on said spindle, a reversing gear housing detachably connected to the rear portion of said headstock and in which said first shaft is journaled, a driving pulley carried by said reversing gear housing, means within said reversing gear housing to reverse the direction of rotation of said first shaft, brake mechanism to stop rotation of said first shaft located within said reversing gear housing, and a manually operable member exteriorly of said housing to actuate said reversing means, and also said brake mechanism.

7. A spindle driving mechanism comprising a headstock, first, second, and third shafts and a spindle all journaled upon substantially parallel axes in the interior of said headstock, each of said shafts having a plurality of change gears adjustable endwise thereon to engage corresponding gears upon the next shaft mounted rigidly thereon, the endwise adjustable gears of the third shaft serving to engage and drive the lathe spindle through gears rigidly mounted on said spindle, a reversing gear housing detachably connected to the rear portion of said headstock and in which said first shaft is journaled, a driving pulley carried by said reversing gear housing, a pair of beveled gears facing each other and loosely journaled on said first shaft within said reversing gear housing, a beveled gear rotatably mounted in said housing in position to mesh with each of said beveled gears on said first shaft, means to selectively clutch said beveled gears to said first shaft means within said reversing gear housing to apply brake pressure to stop the rotation of said first shaft, and an actuating lever operable to selectively clutch one of said beveled gears to said first shaft and to apply said brake pressure.

8. A spindle driving mechanism comprising a headstock, first, second, and third shafts, and a spindle, all journaled upon substantially parallel axes in the interior of said headstock, each of said shafts having a plurality of change gears adjustable endwise thereon to engage corresponding gears upon the next shaft mounted rigidly thereon, the endwise adjustable gears of the third shaft serving to engage and drive the lathe spindle through gears rigidly mounted on said spindle, a reversing gear housing detachably connected to the rear portion of said headstock and in which said first shaft is journaled, a driving pulley carried by said reversing gear housing, means within said reversing gear housing to reverse the direction of rotation of said first shaft, a manually operable member exteriorly of said housing to actuate said reversing means, and a hand wheel rigidly mounted on said first shaft exteriorly of said housing to manually rotate or position said spindle.

In testimony whereof I have affixed my signature.

LOUIS THIEL.